May 5, 1959     R. B. PEET     2,885,264
HEMIHYDRATE PROCESS FOR PHOSPHORIC ACID MANUFACTURE
Filed June 10, 1955
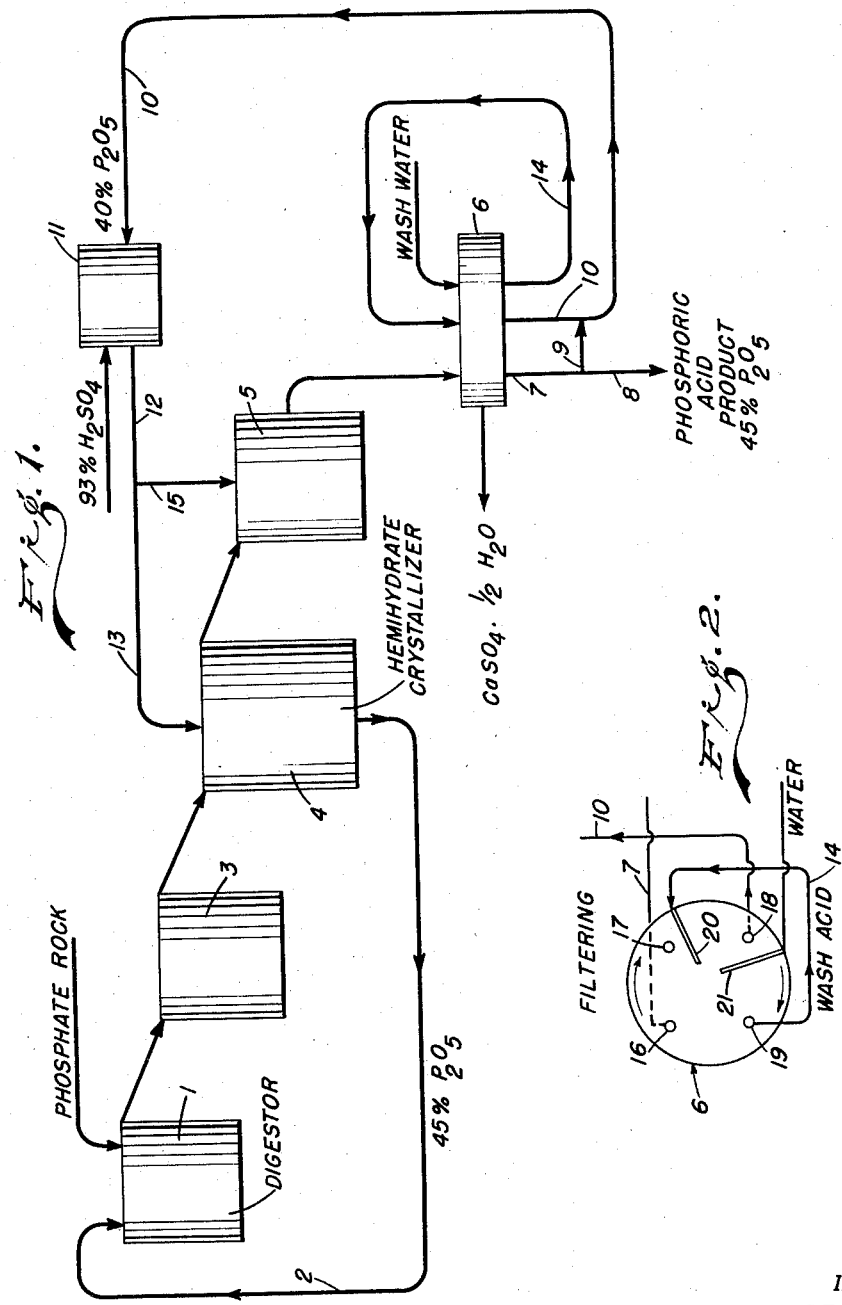
INVENTOR.
ROBERT B. PEET
BY
ATTORNEY.

2,885,264
Patented May 5, 1959

2,885,264

HEMIHYDRATE PROCESS FOR PHOSPHORIC ACID MANUFACTURE

Robert B. Peet, Danbury, Conn., assignor to Chemical Construction Corporation, New York, N.Y., a corporation of Delaware Application June 10, 1955, Serial No. 514,633

3 Claims. (Cl. 23—165)

This invention relates to the manufacture of phosphoric acid by digesting phosphate rock in strong aqueous phosphoric acid and precipitating calcium sulfate hemihydrate from the resulting monocalcium phosphate solution. The invention is directed particularly to methods of obtaining a calcium sulfate hemihydrate of improved filterability and washability in this process.

While the principles of the invention may be applied to the production of phosphoric acid for any purpose, they are of particular value in producing strong phosphoric acid for use in the manufacture of triple superphosphate, which ordinarily requires a phosphoric acid of 40–50% $P_2O_5$ content or stronger. In order to obtain phosphoric acid of this strength, ground phosphate rock is usually digested with strong aqueous phosphoric acid to form a solution of monocalcium phosphate from which free phosphoric acid is liberated by the addition of sulfuric acid. In order to obtain a complete liberation of the phosphate content of the rock in a minimum of time the digestion is usually carried out at elevated temperatures of about 80° C. or higher, and under these conditions the addition of sulfuric acid results in the formation of a suspension of calcium sulfate hemihydrate crystals in a strong aqueous phosphoric acid. It is a principal object of the present invention to provide a method of calcium sulfate hemihydrate formation which will result in the production of crystals of improved filterability and washability in order to facilitate the subsequent filtering and washing procedure.

My present invention is the result of an extensive study of the formation of calcium sulfate hemihydrate crystals by the addition of sulfuric acid to solutions of monocalcium phosphate in strong aqueous phosphoric acid at elevated temperatures. This study has shown that it is possible to obtain calcium sulfate hemihydrate in the form of hard and compact agglomerates which are free filtering and easily washable by careful control of the conditions under which these crystals are formed. By carrying out the sulfuric acid treatment of the monocalcium phosphate solutions obtained from the digestion of ground phosphate rock with strong phosphoric acid under the operating conditions hereinafter described the filtration and washing steps of the process are greatly facilitated with a corresponding improvement in plant operation.

The principal factor in the formation of free-filtering calcium sulfate hemihydrate crystals is the control of the ratio of sulfuric acid to monocalcium phosphate in the hemihydrate crystallizer or, when more than one is used, in the first crystallizer. A deficiency of sulfuric acid should be maintained in this vessel; i.e., the quantity of sulfuric acid introduced should be less than the stoichiometric equivalent of the calcium content of the monocalcium phosphate present, and this deficiency must be maintained within rather narrow limits. Agglomerates of calcium sulfate hemihydrate crystals which are free filtering and easily washable are obtained when the deficiency of sulfuric acid is maintained within the range of slightly more than 1.5% to about 3%, and the most favorable range is from 1.8% to 2.8%. It is true that free filtering hemihydrate crystals can be obtained at a sulfuric acid deficiency in the range of from zero to 1.5% but these crystals are poorly washable and appear under the microscope as jagged agglomerates. Crystals formed with a deficiency of sulfuric acid in the range of from about 3–3.5% are in the form of poor filtering rods and loose agglomerates. The crystals obtained in the proper operating range, however, appear under the microscope as simple compact agglomerates which are easily filtered and require a minimum of wash water. They also have a much slower rate of rehydration to gypsum than ordinary calcium sulfate hemihydrate crystals.

A temperature sufficiently high to ensure the formation of calcium sulfate hemihydrate is of course necessary in the first hemihydrate crystallizer but this will vary with the strength of the phosphoric acid used. With 40% $P_2O_5$ the optimum temperatures are in the range of 90°–105° C. or higher; with stronger phosphoric acid temperatures as low as 80° C. may be used. The concentration of reagents is preferably such as to form a calcium sulfate hemihydrate suspension of slurry of about 20–30% solids.

The invention will be further described and illustrated with reference to the accompanying drawings wherein Fig. 1 is a flow sheet of a process in which the principles thereof are embodied and Fig. 2 is a plan view showing the operation of a rotary horizontal vacuum filter of the type used in filtering suspensions of hydrated calcium sulfate crystals in phosphoric acid solutions.

Referring to Fig. 1 the digestion system may consist of one or more digestion tanks provided with suitable agitation, two being illustrated. Ground phosphate rock, about 75% of which has a particle size of 200 mesh or smaller, is fed continuously into a digester 1 along with a stream of strong phosphoric acid which is recycled through line 2. The contents of tank 1 overflow into a second digestion tank 3, wherein dissolution of the tricalcium phosphate content of the rock is completed, and the resulting monocalcium phosphate solution overflows into a hemihydrate crystallizer 4. Sulfuric acid, which is preferably in admixture with recycled phosphoric acid, is added to the monocalcium phosphate solution in crystallizer 4 and free phosphoric acid and calcium sulfate hemihydrate are formed by the reaction

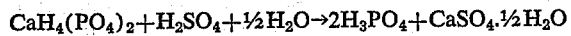

$$CaH_4(PO_4)_2 + H_2SO_4 + \tfrac{1}{2}H_2O \rightarrow 2H_3PO_4 + CaSO_4 \cdot \tfrac{1}{2}H_2O$$

A portion of the resulting slurry is recycled through line 2 to the digester 1 for use in digesting further quantities of phosphate rock and the remainder overflows into a second crystallizer 5 in which the formation and crystallization of calcium sulfate hemihydrate is completed. The resulting suspension is passed to a filter 6 wherein the strong phosphoric acid is separated from the calcium sulfate crystals by filtration and washing. The strong phosphoric acid leaves the filter through line 7 and a portion is withdrawn through line 8 as product acid, the remainder flowing through line 9 for admixture with dilute phosphoric acid obtained as wash water from the filter. The resulting phosphoric acid solution is passed through line 10 to a mixing tank 11, wherein it is mixed with sulfuric acid. The mixed acids leave the tank 11 through line 12 and a major proportion passes through line 13 into crystallizer 4, a small remainder being passed through line 15 into tank 5 to complete the calcium sulfate hemihydrate formation and phosphoric acid liberation.

The operation of the filter 6 will become evident from a consideration of Fig. 2 of the drawings. This figure shows in plan view a rotary platform filter, which consists essentially of a circular pan or filter element carried on a large ball race and rotated by a chain drive in the clockwise direction shown by the arrows. The filter pan is divided into four sections having separate outlets 16, 17, 18 and 19, respectively. The sections communicating with outlets 16 and 17 are filter sections from which the primary filtrate is withdrawn through line 7. The sections communicating with outlet pipes 18 and 19 are wash sections, being provided with spray pipes 20 and 21 for the application of wash acid and of water, respectively. The wash acid supplied to spray pipe 20 is a dilute phosphoric acid taken from outlet pipe 19 through line 14 while fresh water is supplied to the spray pipe 21. The liquor from the first wash section, obtained from outlet pipe 18 through line 10, therefore has a fairly high phosphoric acid content, and this is increased to a $P_2O_5$ content of about 30–40% by admixture with primary filtrate through line 9. It will be understood that filters of other types may be used if desired.

The filter 6 is provided with a filter cloth covering the circular filter pan but a filter aid such as diatomaceous earth is not used. It will be readily understood, therefore, that the size and shape of the calcium sulfate hemihydrate crystals in the suspension being filtered have an important effect on the filtration rate and on the amount of wash water that must be used. The quantity of wash water, in turn, will affect the strength of the phosphoric acid that can be produced by the process as well as the overall recovery of phosphoric acid from the phosphate rock. The importance of the present invention in producing a more easily filterable and washable type of calcium sulfate hemihydrate crystals than has heretofore been obtained will therefore be appreciated.

The temperature and phosphoric acid concentrations to be maintained in the digesters 1 and 3 are preferably such as to obtain a rapid and complete dissolution of all the tricalcium phosphate content of the ground phosphate rock and it is an advantage of the invention that a rapid and complete digestion can be obtained, even with coarse rock in which 80% is between 80 and 100 mesh in size, while maintaining conditions which will result in the formation of the desired easily filterable type of calcium sulfate hemihydrate crystals in the crystallizer 4. This is true because the conditions of high temperature and strong phosphoric acid which promote rapid and complete digestion in the tanks 1 and 3 will also assist materially in obtaining the right type of crystals in the crystallizer 4 when a deficiency of sulfuric acid in the range indicated above is maintained therein. Temperatures of at least 80° C. and preferably 90°–100° C. are employed in the digesters 1 and 3 and phosphoric acid containing at least 40% $P_2O_5$ and preferably 45–50% $P_2O_5$ or stronger is used. With these operating conditions, and with a recycle rate corresponding to 20 cc. of phosphoric acid in the line 2 per gram of phosphate rock fed to the digester 1, complete dissolution of the phosphate values of the rock can be obtained in as little as 8 to 12 minutes residence time in each of the tanks 1 and 3. However, as a practical matter, a somewhat longer residence time in these tanks is preferred to ensure complete extraction of the values from oversize particles of the phosphate rock.

The optimum operating conditions in the first hemihydrate crystallizer 4 have been described above. In general, higher temperatures in this vessel favor the formation of free filtering calcium sulfate hemihydrate agglomerates, and therefore temperatures in the neighborhood of 95–100° C. or higher are preferred. Experience has shown, however, that under the conditions maintained in practicing the invention many materals of construction are subject to corrosion at the high temperatures employed, and therefore a lining of Buna-N rubber or "Laminac" 4111 resin for the digestion and crystallizing tanks is recommended.

The conditions to be maintained in the second crystallizer 5 are relatively unimportant. Sufficient sulfuric acid is introduced into this tank through the line 15 to make up for the sulfuric acid deficiency maintained in tank 4, and also preferably to establish an excess of about 1–2% of free sulfuric acid. This ensures complete precipitation of all the dissolved calcium except that which is held in solution by the solubility of calcium sulfate at the temperatures employed. It will be understood that most of the calcium sulfate hemihydrate, usually about 85–90%, is crystallized in the crystallizer 4, the balance being produced in the crystallizer 5. The type of crystals in the vessel 5 therefore does not materially affect the process.

The invention will be further described by the following specific examples. It should be understood, however, that although these examples may describe in detail certain preferred operating conditions of the invention they are given primarily for purposes of illustration and the invention in its broader aspects is not limited thereto.

*Example 1*

The equipment illustrated in Fig. 1 of the drawings was used on a pilot plant scale except that an experimental vacuum filter was substituted for the continuous rotary filter shown in order to measure filtration rates and washings.

Ground Florida pebble phosphate rock containing about 76% of tricalcium phosphate was used at a feed rate of 100 grams per minute with a recycle rate of 2 liters per minute in the line 2. The phosphoric acid in this line contained 45% of $P_2O_5$ and no sulfuric acid; the temperature in digesters 1 and 3 was 90° C.

The make-up acid in line 12 contained 16.3% by weight of sulfuric acid and 33.4% $P_2O_5$ with a specific gravity of 1.46; the quantity of this acid supplied to the first crystallizer 4 was 320 cc. per minute and that passing through line 15 was 50 cc. per minute. In the crystallizer 4 the temperature was 90° C., the solids content of the slurry was 25% and the deficiency of sulfuric acid was from 1.8 to 2.8% corresponding on a stoichiometric basis to 0.67% to 1.15% of unreacted calcium.

The run was continued for 22 hours under these conditions and good smooth crystal agglomerates were obtained permitting filtration at rates as high as 200 lbs. per hour per square foot of filter surface. At this filtration rate and with 0.67 lb. of wash water per pound of dry cake the wet filter cake contained 2.45% $P_2O_5$ including 2% water soluble and 0.44% citrate soluble; the cake contained 25.4% of water. The overall recoveries of $P_2O_5$ from the rock were from 89% to 92%.

*Example 2*

The procedure of Example 1 was repeated but the temperature in the digesters and in the first crystallizer was increased to 95°–100° C. with a retention time of 3 hours. Smooth crystal agglomerates were produced during three operating periods of 14, 14 and 22 hours while the sulfuric acid control in the crystallizer 4 was maintained at a deficiency of from 1.7 to 2.8% below the amount necessary to react with all of the calcium present. Filtration rates of about 160 lbs. of dry cake per hour per square foot of filter area were obtained, and with 0.55 lb. of wash water per pound of dry cake the wet filter cake contained 2.61% of $P_2O_5$ including 1.46% water soluble and 1.15% citrate soluble and 24.7% of water. The overall $P_2O_5$ recovery was 88%.

What I claim is:
1. A method for the production of strong phosphoric acid of at least 40% $P_2O_5$ concentration which comprises reacting phosphate rock with strong aqueous phosphoric acid of at least 40% $P_2O_5$ content in a digesting step at temperatures of at least 80° C. and introducing the resulting monocalcium phosphate solution into a first precipitating and crystallizing step along with sulfuric acid and additional phosphoric acid, said sulfuric acid being added in said precipitating and crystallizing step in amounts from 1.5% to 3% less than the stoichiometric equivalent of the monocalcium phosphate precipitating about 85% to 90% of the calcium sulfate as hemihydrate, maintaining therein a temperature of at least 80° C. and a phosphoric acid concentration of at least 40% $P_2O_5$ thereby forming a suspension of smooth and easily filterable calcium sulfate hemihydrate crystal agglomerates in phosphoric acid which also contains the remaining monocalcium phosphate, recovering a portion of said phosphoric acid containing calcium sulfate hemihydrate crystal agglomerates in suspension and recycling said portion to said initial digestion step, passing the remaining portion of the phosphoric acid with suspended calcium sulfate hemihydrate crystal agglomerates to a second precipitation and crystallization step and reacting said remaining portion of the monocalcium phosphate with additional sulfuric acid sufficient to precipitate the remaining soluble calcium as calcium sulfate, and separating the thus produced strong phosphoric acid of at least 40% $P_2O_5$ content from the precipitated calcium sulfate by filtration.

2. A method according to claim 1 wherein the deficiency of sulfuric acid in the first precipitating and crystallizing step is within the range of from 1.8% to 2.8%.

3. A method according to claim 1 wherein the temperature during precipitation and crystallization is maintained in the range of 90° C. to 105° C.

References Cited in the file of this patent

UNITED STATES PATENTS

| | | |
|---|---|---|
| 1,836,672 | Larsson | Dec. 15, 1931 |
| 1,902,648 | Larsson | Mar. 21, 1933 |
| 2,049,032 | Weber et al. | July 28, 1936 |
| 2,233,956 | Moore | Mar. 4, 1941 |
| 2,710,247 | Knowles et al. | June 7, 1955 |